US010749875B2

(12) United States Patent
Vincent et al.

(10) Patent No.: US 10,749,875 B2
(45) Date of Patent: Aug. 18, 2020

(54) SECURITY CONFIGURATION LIFECYCLE ACCOUNT PROTECTION FOR MINORS

(71) Applicant: Microsoft Technology Licensing, LLC, Redmond, WA (US)

(72) Inventors: Benjamin Vincent, Kirkland, WA (US); Ariel Gordon, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 16/022,554

(22) Filed: Jun. 28, 2018

(65) Prior Publication Data
US 2020/0007554 A1  Jan. 2, 2020

(51) Int. Cl.
*H04L 29/06* (2006.01)

(52) U.S. Cl.
CPC .......... *H04L 63/105* (2013.01); *H04L 63/083* (2013.01); *H04L 63/102* (2013.01)

(58) Field of Classification Search
CPC ... H04L 63/105; H04L 63/083; H04L 63/102; G06F 21/31; G06F 2221/2113; G06F 2221/2139; G06F 2221/2141; G06F 21/6218
See application file for complete search history.

(56) References Cited

U.S. PATENT DOCUMENTS

| 8,205,247 B2 | 6/2012 | Lexcellent et al. |
| 8,505,085 B2 | 8/2013 | Logan et al. |
| 8,601,554 B2 | 12/2013 | Gordon et al. |

(Continued)

FOREIGN PATENT DOCUMENTS

GB  2549126 A  10/2017

OTHER PUBLICATIONS

Sharif Jameel, "Privilege Creep: Prevention and Correction", retrieved from <<https://cgscomputer.com/privilege-creep-prevention-correction/>>, Sep. 22, 2017, 9 pages.

(Continued)

*Primary Examiner* — Matthew Smithers
(74) *Attorney, Agent, or Firm* — Ogilvie Law Firm

(57) ABSTRACT

Described technologies enhance cybersecurity and facilitate computing system account usage by configuring a primary account and a supplementary account together in a security configuration lifecycle. The primary account user may be a parent or other adult, while the supplementary account user may be a child or other person with less capacity than the primary user. Over time, the accounts may transition together through security configurations to give more capabilities to the supplementary user, e.g., login separate from the primary user, and to reduce the control of the primary user over the supplementary account. Security configuration lifecycle stages are implemented, e.g., using capability-security pair data structures and account security configuration code. Despite the security configuration linkage of the accounts, each account may have its own personalized content and its own recommendation history. Lifecycle position identification supports automatic reasoning to select an age-appropriate consent obtention procedure, and facilitates documentary media timeline creation.

20 Claims, 7 Drawing Sheets

(56) References Cited

U.S. PATENT DOCUMENTS

| | | | |
|---|---|---|---|
| 8,621,614 | B2 | 12/2013 | Vaithilingam et al. |
| 8,639,750 | B2 | 1/2014 | Gordon et al. |
| 8,898,752 | B2 | 11/2014 | Gordon et al. |
| 8,973,099 | B2 | 3/2015 | Reeves, Jr. et al. |
| 9,246,894 | B2 | 1/2016 | Gordon et al. |
| 9,282,093 | B2 | 3/2016 | Luk et al. |
| 9,537,851 | B2 | 1/2017 | Gordon et al. |
| 9,544,310 | B2 | 1/2017 | Gordon et al. |
| 9,648,002 | B2 | 5/2017 | Chauhan et al. |
| 9,690,924 | B2 | 6/2017 | McClure et al. |
| 9,706,401 | B2 | 7/2017 | Vincent et al. |
| 9,787,654 | B2 | 10/2017 | Vincent et al. |
| 9,942,223 | B2 | 4/2018 | Vincent et al. |
| 9,967,244 | B2 | 5/2018 | Saboori et al. |
| 2011/0041140 | A1* | 2/2011 | Harm ............... G06F 9/4843 719/318 |
| 2011/0072039 | A1* | 3/2011 | Tayloe ............ G06F 21/6218 707/769 |
| 2011/0173221 | A1 | 7/2011 | Ahiakpor et al. |
| 2013/0073460 | A1 | 3/2013 | Paquin et al. |
| 2013/0139264 | A1* | 5/2013 | Brinkley ........... G06F 21/566 726/24 |
| 2013/0145472 | A1* | 6/2013 | Ramabhatta ...... G06F 21/566 726/25 |
| 2014/0123279 | A1* | 5/2014 | Bishop ............ H04L 63/1491 726/23 |
| 2014/0150068 | A1* | 5/2014 | Janzer ................ H04L 63/20 726/4 |
| 2014/0215617 | A1* | 7/2014 | Smith ............ H04L 63/1441 726/23 |
| 2016/0014081 | A1* | 1/2016 | Don, Jr. .......... H04L 63/0236 726/11 |
| 2016/0142409 | A1 | 5/2016 | Frei et al. |
| 2017/0201549 | A1 | 7/2017 | Vincent et al. |
| 2017/0237753 | A1* | 8/2017 | Manning Dawson ................ H04L 63/1483 726/23 |
| 2017/0302659 | A1 | 10/2017 | Shteingart et al. |
| 2017/0346829 | A1 | 11/2017 | Gordon et al. |
| 2018/0034798 | A1 | 2/2018 | Vincent et al. |
| 2018/0048590 | A1 | 2/2018 | Gordon et al. |
| 2019/0121978 | A1* | 4/2019 | Kraemer ........... G06F 21/565 |
| 2019/0215301 | A1* | 7/2019 | Abdulhayoglu .... H04L 63/1425 |
| 2019/0238548 | A1* | 8/2019 | Chauhan ............ G06F 21/604 |

OTHER PUBLICATIONS

"Age of majority", retrieved from <<https://en.wikipedia.org/wiki/Age_of_majority>>, May 31, 2018, 9 pages.
"Timeline", retrieved from <<https://en.wikipedia.org/wiki/Timeline>>, Mar. 29, 2018, 3 pages.
"Capacity (law)", retrieved from <<https://en.wikipedia.org/wiki/Capacity_(law)>>, Feb. 16, 2018, 6 pages.
"Schedule (computer science)", retrieved from <<https://en.wikipedia.org/wiki/Schedule_(computer_science)>>, Apr. 5, 2018, 10 pages.
"Provisioning", retrieved from <<https://en.wikipedia.org/wiki/Provisioning>>, Mar. 26, 2018, 7 pages.
"Privilege escalation", retrieved from <<https://en.wikipedia.org/wiki/Privilege_escalation>>, May 25, 2018, 4 pages.
"Managing User Accounts: Procedure", retrieved from <<https://docs.oracle.com/en/cloud/saas/applications-common/-13-update18a/ochus/managing-application-users.html#OCHUS1218109>>, copyright dates 2011, 2018, 13 pages.
Lou Hermes, "Simplify Your Life—How to Auto Assign Roles in Oracle Fusion", retrieved from <<https://smartdogservices.com/simplify-life-auto-assign-roles-oracle-cloud-financials/>>, Jul. 26, 2016, 6 pages.
"Multi User", retrieved from <<https://marketplace.magento.com/cminds-multi-user-account.html>>, copyright date 2018, some comment dates earlier, 11 pages.
"What is a Multi-User Account?", retrieved from <<https://www.simplycast.com/interactive-marketing-support/faqs/what-is-a-multi-user-account/>>, copyright date 2018, 4 pages.
"Multi User Credentials", retrieved from <<https://sendgrid.com/docs/API_Reference/Customer_Subuser_API/multi_cred.html>>, retrieval date Jun. 2, 2018, 7 pages.
"Using Provisioning to Automate Credential Entry", retrieved from <<https://docs.citrix.com/en-us/single-sign-on/5/pm-policies-wrapper-v48/pm-provisioning-template-process-task.html>>, May 9, 2015, 6 pages.
"user account provisioning", retrieved from <<https://searchsecurity.techtarget.com/definition/user-account-provisioning>>, Oct. 2010, 4 pages.
"SSL implementation and credential provisioning", retrieved from <<https://help.deepsecurity.trendmicro.com/deep-security-ssl-implementation.html>>, retrieval date Jun. 2, 2018, 2 pages.
"Novell Credential Provisioning Policies for Identity Manager 3.5.1", retrieved from <<https://www.novell.com/documentation/idm35/policy_credprov/data/bookinfo.html>>, retrieval date Jun. 2, 2018, 1 page.
"Parental consent and Microsoft child accounts", retrieved from <<https://support.microsoft.com/en-us/help/4090274/microsoft-account-parental-consent-and-child-accounts>>, May 10, 2018, 4 pages.
"Family Sharing and Apple ID for your child", retrieved from <<https://support.apple.com/en-us/HT201084>>, Apr. 30, 2018, 4 pages.
"Create a Google Account for a child under 13 or the applicable age in your country", retrieved from <<https://support.google.com/families/answer/7103338?hl=en>>, copyright date 2018, 4 pages.
"Single sign-on", retrieved from <<https://en.wikipedia.org/wiki/Single_sign-on>>, May 25, 2018, 6 pages.
"Linked Accounts", retrieved from <<https://support.wattpad.com/hc/en-us/articles/201456610-Linked-Accounts>>, May 3, 2018, 3 pages.
David Nield, "Flow to Set Up Accounts for Your Kids on Any Computer", retrieved from <<https://fieldguide.gizmodo.com/how-to-set-up-accounts-for-your-kids-on-any-computer-1747274339>>, Dec. 15, 2015, 6 pages.
Melanie Pinola, "Flow to Use the Parental Controls in Windows 10", retrieved from <<https://www.laptopmag.com/articles/parental-controls-windows-10>>, Dec. 3, 2015, 8 pages.
"Joint iTunes Account with iCloud", retrieved from <<https://discussions.apple.com/thread/4110607>>, Jul. 16, 2012, 2 pages.
"Divorce", retrieved from <<https://discussions.apple.com/thread/8187888>>, Dec. 5, 2017, 2 pages.
Alia Hoyt, "Why Couples Share a Facebook Profile—and Why It Bugs the Rest of Us", retrieved from <<https://computer.howstuffworks.com/internet/social-networking/networks/why-couples-share-a-facebook-profile-why-it-bugs-the-rest-us.htm>>, Mar. 23, 2016, 7 pages.
Carolyn Nicander Mohr, "1 iTunes Account, 4 Users, What to Do?", retrieved from <<https://www.wonderoftech.com/1-itunes-account-4-users-what-to-do/>>, Jul. 20, 2011, 16 pages.
"International Search Report and Written Opinion Issued in PCT Application No. PCT/US19/038353", dated Aug. 30, 2019, 14 Pages.

* cited by examiner

SECURITY CONFIGURATION LIFECYCLE ACCOUNT PROTECTION FOR MINORS

BACKGROUND

Security goals in a computing system include confidentiality, integrity, and availability. These goals are promoted by implementing administrative, technical, and physical security controls which attempt to detect, prevent, contain, or mitigate unauthorized access to secured items and to allow authorized access to secured items. Secured items may be, e.g., data, services, or physical items.

Computing system administrators at governmental agencies, institutions, and commercial enterprises often follow a "principle of least privilege" by giving each user only the security privileges that the user needs to do her or his assigned job. When a user changes job roles, a privilege review helps prevent the user from retaining privileges they no longer need; this reduces "privilege creep". In particular, it is prudent to promptly disable or remove all privileges when a user is terminated from employment.

In many computing systems, secured items are accessed by a given user through a user account that is established for the user by an authorized administrator of the computing system. Controlled access to an item often undergoes security phases such as identification, authentication, authorization, auditing, and accountability. Identification of the user with respect to an account is performed with a username, email address, user number, or other user identifier. Authentication of the asserted identity is performed using one or more factors such as something the user knows (e.g., a password), something the user has (e.g., a keycard), and something the user is (e.g., biometric such as an iris scan or fingerprint). Authorization may implement a discretionary control, e.g., an access control list managed per-item by the user, or a mandatory control such as a user clearance level, need-to-know, and item classification. Access activities may be audited by inspecting usage logs, and by automated tools such as intrusion detection systems. Accountability can be imposed by enforcing technical, administrative, or legal consequences for unauthorized access activities, including actual or attempted unauthorized access to secured items.

SUMMARY

Many teachings herein are motivated by the challenge of providing appropriate account security credentials to minor age users over time as they mature. Some technologies described herein are directed to the technical activity of automatically increasing privileges in a computing system account as a user gains maturity. An account's security configuration may evolve automatically in stages as the account's minor user grows from a toddler to a young child to a pre-teen to a teenager, for example, giving the young user more privileges over time as he or she matures. A related account for a parent or teacher or other adult may automatically lose corresponding privileges, as authority over the minor's account shifts from the adult to the maturing minor.

Some teachings herein are directed to specific examples of stages in a security configuration lifecycle. Technical mechanisms to implement lifecycle stages are described, e.g., for allocating identity and other security credentials between two related accounts (primary and supplementary) based on a supplementary user's capability level, or on the current security configuration lifecycle stage of the accounts. These technical mechanisms may include specific security credential configurations, and data structures for selecting between configurations. Examples of automated services based on lifecycle stage are also discussed, e.g., for personalization, recommendation history maintenance, and other processes.

Specific technical tools and techniques described here also respond to the related challenges of efficiently and effectively associating user-specific data with users who are legally of minor age. Some examples of user-specific data include recommendation histories and age-appropriate consents.

Some examples herein apply security configuration lifecycle mechanisms for the benefit of users who are in societal relationships other than a minor↔adult relationship. For instance, consider a dependent senior and a more technologically fluent caregiver. The senior may become less capable as time passes, leading to reverse movement in the security configuration lifecycle.

One embodiment described herein may detect a supplementary account creation trigger during use of a primary account by a primary user. In response, the embodiment may create a supplementary account for a supplementary user, and designate the supplementary account and the primary account as accounts having respective security configurations which relate to one another. In some cases, the embodiment obtains supplementary user capability information which indicates that the supplementary user has a physical age that is less than eighteen years. Based on at least a portion of the supplementary user capability information, the embodiment automatically configures the primary account and automatically configures the supplementary account, thereby positioning the configured accounts in a security configuration lifecycle stage which allocates identity and other security credentials between the two accounts. Allocated credentials may include, e.g., a supplementary account login identity, and a supplementary account login credential. The embodiment may perform, revise, or verify identification and authentication provisioning of the primary and supplementary accounts in a manner which is consistent with the supplementary user's physical age being under eighteen years, helps secure the supplementary account against access by unauthorized third parties, and positions the primary and supplementary accounts together within a security configuration lifecycle.

Another embodiment described herein includes a set of three or more digitally implemented capability-security pairs. Each capability-security pair includes a respective capability level and a corresponding security specification which specifies security configuration of a primary account of a primary user and a supplementary account of a supplementary user. In this embodiment, the capability-security pairs include at least the following pairs, labeled for reference here as A, B, and C.

In pair A, a security specification specifies that the supplementary account has no login identity, and the supplementary account has no login credential apart from the primary account. In pair B, the security specification specifies that the supplementary account has an identity apart from a login identity of the primary account, but the supplementary account lacks sufficient login credentials for the supplementary user to login to the supplementary account without assistance from the primary user. In pair C, the security specification specifies that the supplementary account has a login identity apart from a login identity of the primary account, the supplementary account has sufficient login credentials for the supplementary user to login without assistance from the primary user, and the primary account also has a supplementary account login credential which permits the primary user to login to the supplementary account. The capability-security pairs A, B, C may represent or correspond to like-named security configuration lifecycle stages A, B, C.

This embodiment also includes account security configuration code residing in a memory which upon execution with a processor (i) obtains supplementary user capability information, (ii) assigns a capability level to the supplementary user based at least in part on the supplementary user capability information, (iii) selects a capability-security pair corresponding to the assigned supplementary user capability level, and (iv) configures a primary account and a related supplementary account so they are consistent with the security specification of the selected capability-security pair. The capability-security pairs implement a security configuration lifecycle as a progression, in that the pair A capability level indicates less supplementary user capability than the pair B capability level, and the pair B capability level indicates less supplementary user capability than the pair C capability level.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
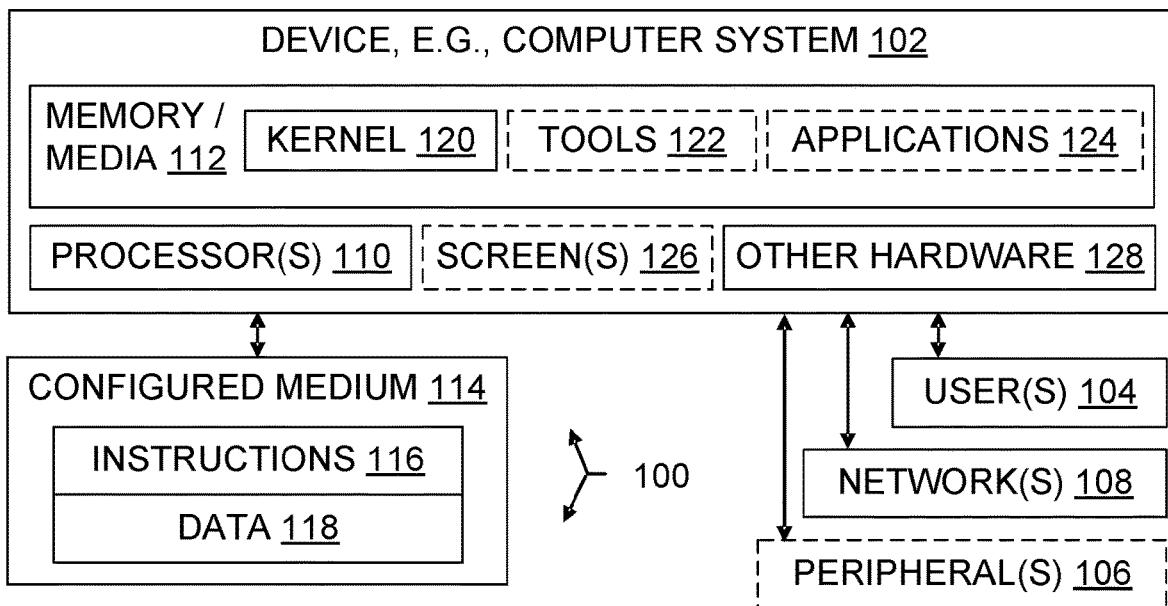
FIG. 1 is a block diagram illustrating a computer system and also illustrating a configured storage medium.

Today's internet services are protected by authentication services that do not evolve as a user grows up. A child age three has different desires, needs and abilities as a software user from a child who is eight years old, or a user fourteen years old. The user's desires, needs and abilities continue to change until the user ultimately becomes an adult, and perhaps even after that milestone. Teachings herein define a lifecycle model that allows the account security configuration to evolve as the user grows up. The account security configuration controls software usage and other services and items provided by a computing system to the user through the account.

In many familiar approaches, when a user creates an account they are treated either as child or as an adult. But the desires, needs and capabilities of a child change as they grow up, and this progression can be modeled in an account security configuration lifecycle, as described herein. Some embodiments described herein implement gradual evolution of an account's security system to provide a balance of control and independence between the minor and their parent, with the balance changing over time as the minor becomes more capable.

An account system security lifecycle as taught herein can help parents manage their child's account both automatically and actively as the young user grows up. This account lifecycle may extend even to prenatal periods. An expectant mother or father may tag an unborn in a photo months before the child is born, e.g., in a picture of the expectant mother, or a sonogram. This tagging can start an online or other digital user presence and create a placeholder for future items. In a relatively early period, such as when a child is two-to-four years old, a parent or guardian may want the minor children to have their own account but retain complete control over that account. In fact, a parent may reasonably conclude that the only reason to have an account for the child is to segregate the child's online activities from the parent's so that the child's video watching preferences don't pollute the parent's, and so that the parent's account data doesn't get accidentally wiped or damaged by the child. At this stage, the child wouldn't be able to authenticate to their account using a traditional username or password and in fact doesn't require their own password on their account, or otherwise need to prove their identity, because the parent logs in for them.

As the child grows, independence becomes more important to the child. At some age, perhaps in the range of four-to-seven years old, the child starts to communicate electronically with a small group of people outside the child's home via email, chat, video calling, and so on. At this stage the child would benefit from a way to be addressed in the computing system, e.g., so that grandpa can initiate a video call. Accordingly, the child would benefit from having an email address associated with the online service through which they receive electronic communications. This means having a username, but not necessarily a password or other credential yet.

As the child user gets even older, they start to venture outside of the parent's control for longer periods of time. Perhaps they are at a friend's house and want to play a video game using an online service. They already have an account but they would benefit from the ability to sign in, either by themselves or with some real-time approval from their parent. Thus, they would benefit from having their own mechanism to authenticate their identity to the online service.

In their teenage years, the user may be almost completely independent and trusted, but would still benefit from the connection to their parent. For instance, at this stage the teen could use their parent to reset their password if they forget it. Nonetheless, in view of their increased maturity the system may be configured such that the parent cannot use the teen's account without the teen's permission.

Finally, as a young adult the maturing user's account can be configured for complete independence from their parent. But they can still look through all their photos and see themselves in the first ultra-sound.

Some embodiments described herein provide one or more of the following distinctive features. An early-stage supplementary account has multiple users, with different privileges. Over a long period of time, the supplementary and primary account privileges for both users (not merely the supplementary user) are based on the age or mental capacity of the supplementary user. The privileges change over time as the supplementary user ages and as a result has increased (or decreased) mental capacity. Other distinctive features are also disclosed.

Some embodiments described herein may be viewed by some people in a broader context. For instance, concepts such as assistance, capability, change, relationships, and security, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to detect cyber intrusions using data that is too scarce or too sparse to operate effectively as a machine learning training set for anomaly detection. Other configured storage media, systems, and methods involving assistance, capability, change, relationships, or security are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems by helping secure those systems to increase the availability, confidentiality, and integrity of the account items in an adaptive manner over the course of several years. For instance, some embodiments set or revise security credentials, such as a login identity, a non-login identity, a login credential, or an account recovery mechanism setting. Some activities of embodiments support the allocation or re-allocation of security credentials between a primary account and a related supplementary account.

Some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein implement capability-security pair data structures, and implement automatic methods utilizing such data structures.

Technical effects provided by some embodiments include a more efficient configuration of account security credentials, a secure association of user-specific data with accounts nominally belonging to minors, an efficient selection of age-suitable consent obtention procedures for accounts nominally belonging to minors, and increased yet secure and maturity-appropriate access to online services by minors.

Some embodiments include technical adaptations such as account security code which automatically reconfigures security for two related accounts over time as a user of one of the accounts matures, and account security configuration lifecycle stages implemented in data structures which specify security configurations for related primary and supplementary accounts based on a capability level of a supplementary account user.

Other advantages based on the technical characteristics of the teachings will also be apparent to one of skill from the description provided.

Acronyms and Abbreviations

Some acronyms and abbreviations are defined below. Others may be defined elsewhere herein or require no definition to be understood by one of skill.

ACL: access control list
ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
NIC: network interface card
OS: operating system
PIN: personal identification number
RAM: random access memory
ROM: read only memory
SMS: short message service
XML: extensible markup language Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as performing, revising, or verifying security credentials, and utilizing capability-security pair data structures, are understood herein as inherently digital. A human mind cannot interface directly with a CPU or other processor, or with RAM or other digital storage, to read and write the necessary data to perform the security configuration lifecycle steps taught herein, or to create the security configuration lifecycle mechanisms taught herein. This would be well understood by persons of skill in the art in view of the present disclosure, but others may sometimes need to be informed or reminded of the facts. Unless stated otherwise, embodiments are also presumed to be capable of operating at scale (i.e., one thousand or more primary users) in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

A "cloud" or "cloud network" is a network accessible through the internet or through an institutional or enterprise or governmental network, which provides compute, storage, and network capabilities to one or more entities on demand from pooled resources, with elasticity and measured service usage.

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as assigning, assisting, basing on, choosing, configuring, creating, credentialing, denoting, designating, detecting, having, including, indicating, lacking, logging in, maintaining, making available, obtaining, operating, performing, positioning, providing, provisioning, recommending, reconfiguring, relating, requesting, residing, revising, securing, selecting, spanning, surfacing, tagging, transitioning, triggering, using, verifying (and assigns, assigned, assists, assisted, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, device drivers
122 tools, e.g., anti-virus software, firewalls, packet sniffer software, intrusion detection systems (IDS), intrusion prevention systems (IPS), software development tools, diagnostics
124 applications, e.g., word processors, web browsers, spreadsheets, games
126 display screens
128 computing hardware not otherwise associated with a reference number 106, 108, 110, 112, 114
202 account
204 security code, e.g., login code, user identification code, user authentication code, code which reads or writes security credentials, access control lists, digital certificates, or cookies
206 account items generally, e.g., files, service interfaces, security credentials
208 user ID, e.g., user name, screen name, avatar, handle, email address
210 password or passphrase
212 digital certificate or token
214 electronically conveyed request
216 electronically conveyed response
302 user age, e.g., an integer representing the user's physical or mental age in years, or a category or enumeration value representing the user's physical or mental age in a sequence of maturity or capability stages such as "womb", "infant", "toddler", "preschooler", "explorer", "tween", "teen", or the like
304 digital photo, video, or audio recording, collectively referred to as "documentary media"
306 posting to a blog, forum, online bulletin board, wiki, or social networking site
308 one or more files generally; file content may be documentary media, executable code, text, or other digital content
310 one or more games or files used for game play; a game is an example of an account service item, since it provides a service (entertainment or edutainment) to a user through an account
312 email address, instant message or SMS address
314 non-login ID, namely, a GUID or other identifier which is not used by a human user as a user ID 208 but is used to automatically identify an account to software
316 recommendation history, e.g., at least one recommendation generated automatically by a recommendation service, or a data structure containing a clickstream or other user activity tracking data which a recommendation service may use as a partial or complete basis for automatically recommending a product or service to a user
318 designation, namely, digital data which designates a supplementary account and a primary account as being accounts whose respective security configurations relate to one another and are thus subject to being configured together according to security configuration lifecycle teachings herein; may be implemented, e.g., as an account identifier 314 in each account identifying the other account
320 societal data, e.g., data which indicates at least one of the following societal relationships exists between a supplementary user and a primary user: child↔parent, child↔teacher, child↔guardian, ward↔guardian, patient↔provider, care-recipient↔caregiver, dependent-parent↔offspring; may be implemented, e.g., as integers or enumeration values representing respective societal roles in designated accounts; societal relationships may also be implicit in code or in a license to use code or an account subscription, or may be evident in account data which is obtained through a user interface such as "Child's name" or "Parent's email address"
322 account settings generally, e.g., login and security settings, privacy settings, preferences such as preferred natural language, payment method, storage size purchased, subscription renewal options, and so on
324 credentials, e.g., digital settings or certificates which promote one or more of the confidentiality, availability, and integrity of an account, and in particular permit, condition, or deny account activity such as login, account item read access, account item modification, account item deletion, or account recovery
326 settings for account recovery, e.g., where an email containing a recovery link will be sent
328 any account items not already covered by the description of items 302-326
400 capability-security pair, namely, a struct, union, record, object, or other data structure which includes (directly or by pointer, handle, ID, address, or other association mechanism) at least a capability level and a corresponding security specification; an identifier such as a pointer or index or address, for example, which identifies a particular capability-security pair may also be referred to as a capability-security pair
402 capability level, namely, an integer or enumeration value which represents the maturity or capability or legal status as to consent or privacy requirements for personally identifying information of minors or people with diminished capacity
404 security specification, namely, a list, array, tree, graph, bitmap, XML text, or other data structure which specifies security credentials for a primary account and two or more corresponding supplementary accounts based on the capability level of the user(s) of the supplementary account(s)
406 group of multiple capability-security pairs in a sequence, array, set, list, collection, or other data structure
500 computing system which is configured with a security configuration lifecycle in the form of capability-security pairs, security configuration lifecycle stages, or security configuration code which allocates identity and other security credentials between two related accounts (primary and supplementary) based on a supplementary user's capability level, or on a current security configuration lifecycle stage of the accounts

Figure 7:
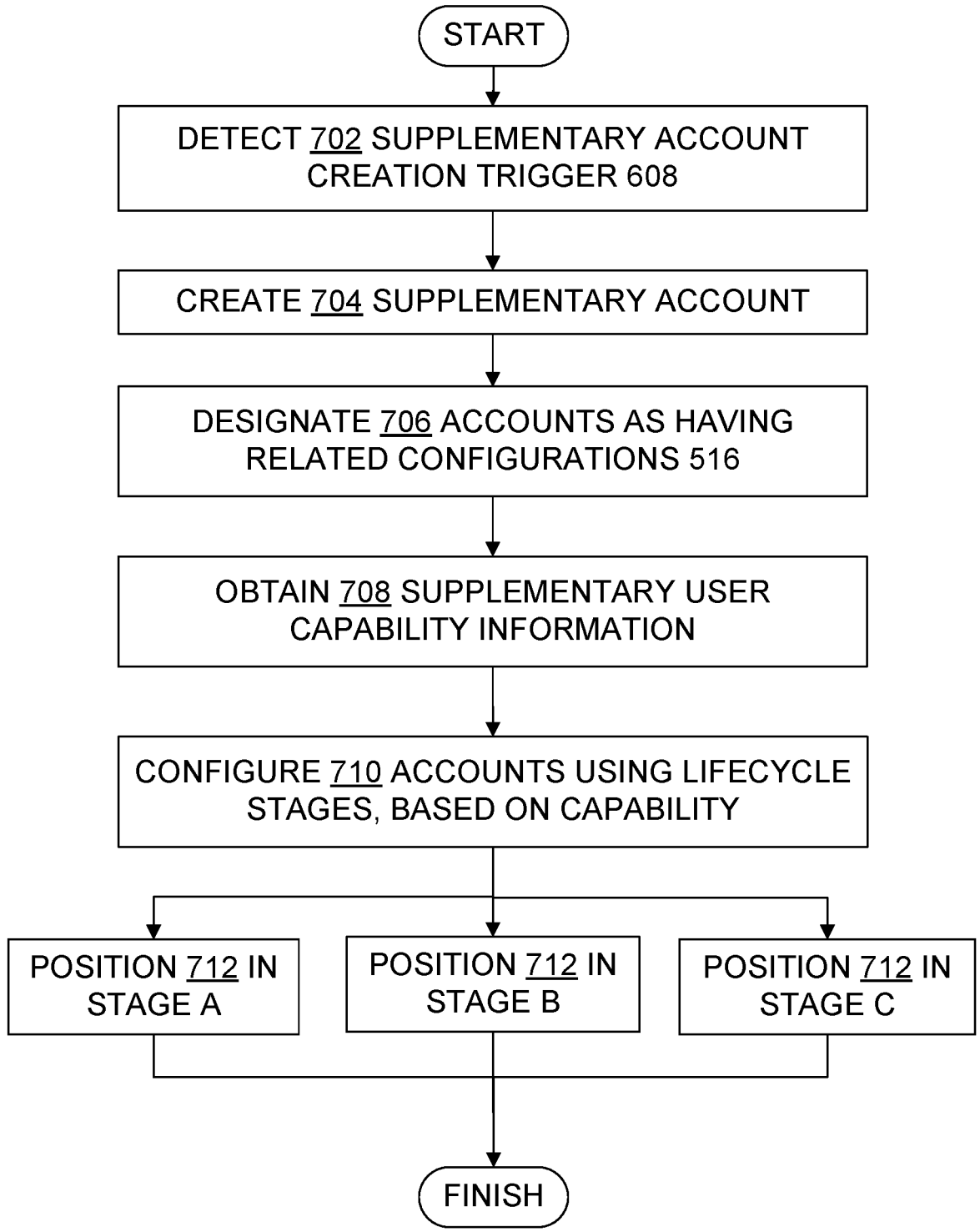
FIG. 7 is a flowchart illustrating example security lifecycle stage configuring methods.
Figure 8:
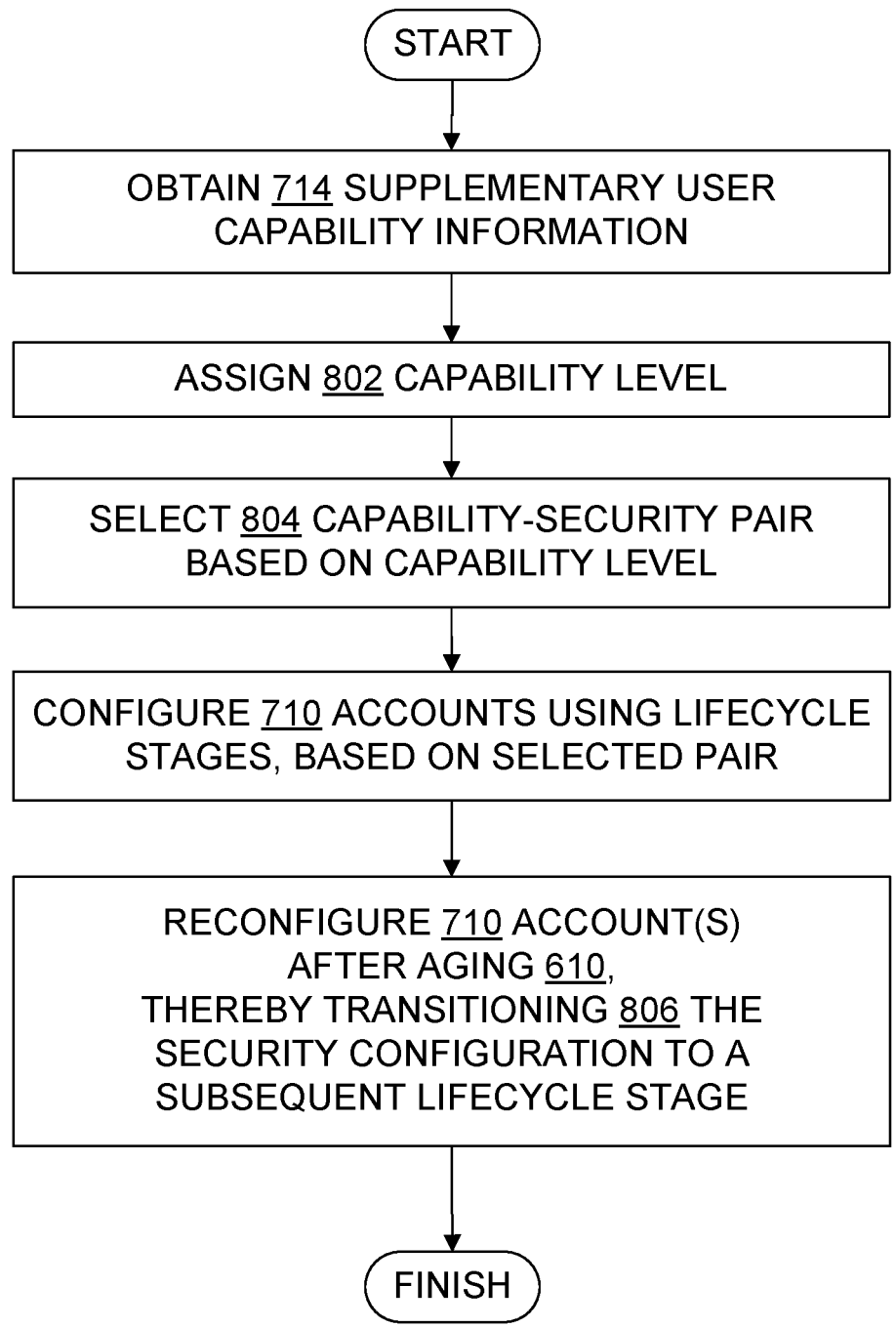
FIG. 8 is a flowchart further illustrating example security lifecycle stage configuring methods.
Figure 9:
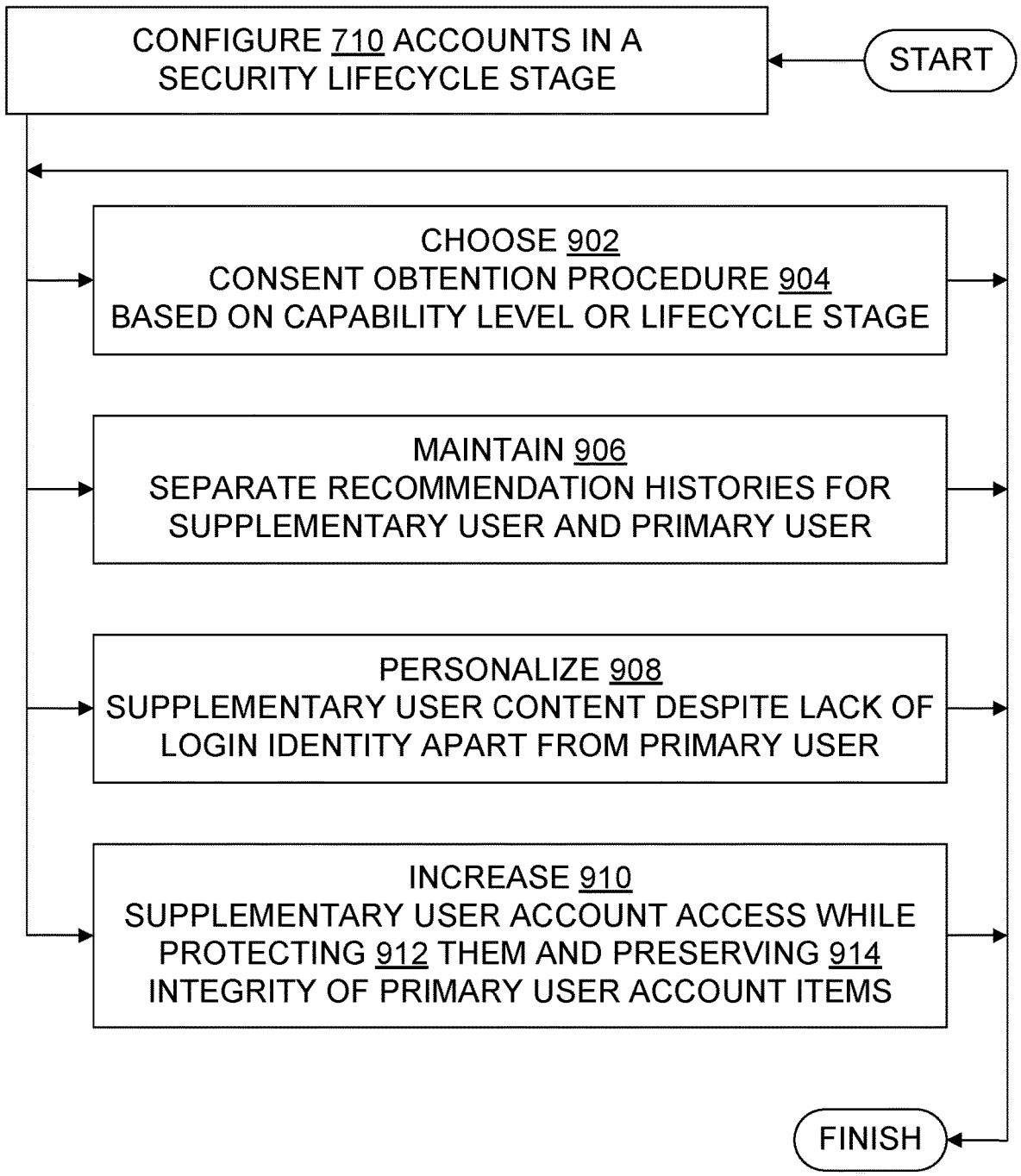
FIG. 9 is a flowchart illustrating example methods which use a security configuration lifecycle stage.

- 502 security configuration lifecycle, namely, a sequence of capability-security pairs or security configuration lifecycle stages or their functional equivalent
- 504 security configuration code, namely, code which upon execution allocates identity and other security credentials between two related accounts (primary and supplementary) based on a supplementary user's capability level, or on a current security configuration lifecycle stage of the accounts; may be implemented as part of security code 204
- 506 user capability information, namely, information which implies or states or represents a user's capability level, e.g., "3 years old", "infant", "novice", "30%", "level 99", or other value
- 508 primary account
- 510 identity credential, e.g., digital structure inside computing system which represents a user ID 208 or otherwise asserts an identity; may also refer to the assertable identity itself
- 512 login credential, e.g., digital structure inside computing system which represents a password 210 or certificate 212 that authenticates an identity credential
- 514 supplementary account
- 516 security configuration of an account, namely, the set of security credentials currently in force to secure the account as to confidentiality, integrity, or availability; includes a designation of the related supplementary or primary account for a primary or supplementary account, respectively; may include one or more login credentials, non-login identity, login identity, a pointer or other identifier of a capability-security pair which is applied to the account, a pointer or other identifier of a security configuration lifecycle stage to which the account currently belongs, and a capability level
- 518 supplementary user age range
- 602 security configuration lifecycle stage; may be implemented as a bundle of credentials, as a pointer or index into a group of capability-security pairs, or as a record, object, struct, or other data structure in a list, array, or other more inclusive data structure which contains at least three stages
- 604 scenario involving adult with diminished capacity
- 606 properties of security configuration lifecycle stage
- 608 trigger for creating supplementary account
- 610 aging in security configuration lifecycle, e.g., by noting that supplementary user's physical age has passed a maximum age specified for a particular security configuration lifecycle stage and automatically transitioning the supplementary user's account to a subsequent security configuration lifecycle stage which has an age range that includes the supplementary user's current physical age; aging transitions a pair of related accounts (supplementary and primary) from one security configuration lifecycle stage to an adjacent security configuration lifecycle stage which provides greater supplementary account capabilities than before the aging
- 700 method for configuring a primary account and a supplementary account according to a security configuration lifecycle, e.g., performing steps whose result is a primary account and a supplementary account which are collectively configured according to a security configuration lifecycle even if no change was made to the primary account, or performing steps which make changes in both a primary account and a supplementary account so they are collectively configured according to a security configuration lifecycle; 700 also refers to the FIG. 7 flowchart which illustrates such methods
- 702 detect a trigger for creating supplementary account
- 704 create a supplementary account; this allocates at least one internal account data structures but does not fully configure the account's security configuration in the lifecycle
- 706 designate a supplementary account and a primary account as having related security configurations; a supplementary account has a single designated primary account, but a primary account may have zero or more designated supplementary accounts
- 708 obtain capability information of a supplementary user, e.g., expected delivery date if unborn, birth date, birth year, physical age in years, mental age in years, enumeration value such as "toddler", "teen", "expert", and so on
- 710 configure a supplementary account and a primary account with related security configurations, e.g., by provisioning them according to a security specification chosen based on the supplementary account user's capability, or by provisioning them according to properties of a security configuration lifecycle stage that matches the supplementary account user's capability or maturity
- 712 position a pair of accounts (supplementary account and corresponding designated primary account) in a security configuration lifecycle stage; this presumes a selection between at least three available stages 602
- 800 method for configuring a primary account and a supplementary account according to a security configuration lifecycle, e.g., performing steps whose result is a primary account and a supplementary account which are collectively configured according to a security configuration lifecycle even if no change was made to the primary account, or performing steps which make changes in both a primary account and a supplementary account so they are collectively configured according to a security configuration lifecycle; 800 also refers to the FIG. 8 flowchart which illustrates such methods
- 802 assign a capability level to a supplementary user based on capability information of the supplementary user
- 804 select a capability-security pair from among at least three capability-security pairs
- 806 transition a pair of related accounts (supplementary and primary) from one security configuration lifecycle stage to another security configuration lifecycle stage; unless expressly stated or shown otherwise, the transition is between adjacent stages; transitioning may be a result of aging or a result of an express request for the transition by a primary user or a result of a primary user consenting to a supplementary user request for the transition
- 900 method for using one or more accounts which have been configured according to a security configuration lifecycle; 900 also refers to the FIG. 9 flowchart which illustrates such methods
- 902 choose a consent obtention procedure
- 904 consent obtention procedure, namely, code which upon execution attempts to obtain consent for receiving, using, or otherwise impacting the confidentiality, availability, or integrity of data pertaining to the privacy or personally identifiable information of a user
- 906 maintain separate recommendation history data 316 for a supplementary user than for the corresponding primary user, or vice versa, e.g., place respective data in different storage locations and provide separate addressing or other identification for the respective data

908 personalize supplementary account content; may be done despite the supplementary account lacking a login identity apart from the primary account; may be done, e.g., by placing supplementary user data in different storage locations and providing separate addressing or other identification for that data, thereby distinguishing it from primary user data

910 increase supplementary user's ability to access account items, e.g., by adding a supplementary user account login credential, by removing a requirement for login assistance from the primary user, or by permitting access to account items for which access by the supplementary user was previously denied based on the supplementary user's previously lower capability level

912 protect account item(s) against unauthorized access

914 preserve integrity of account item(s)

Figure 10:
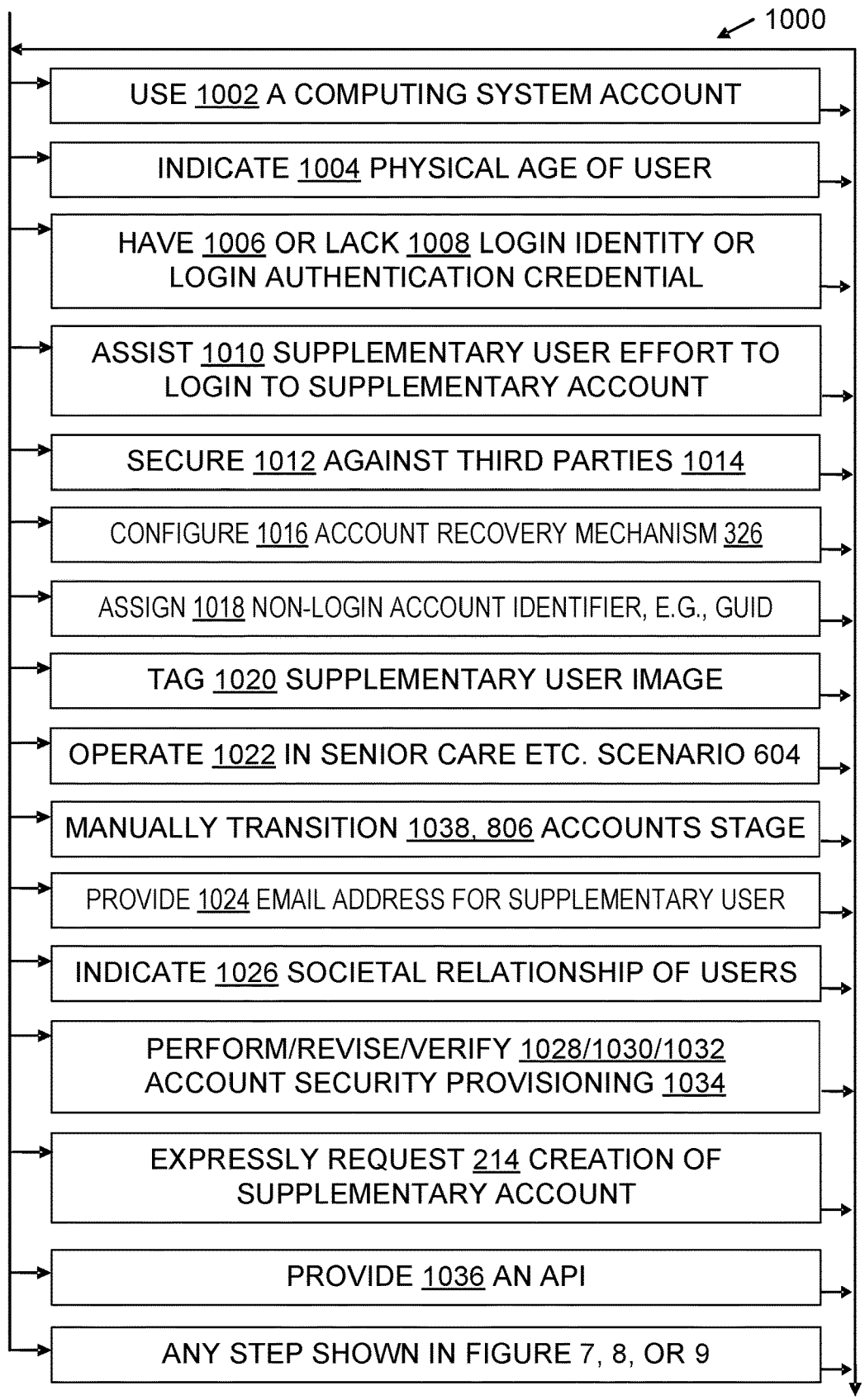
FIG. 10 is a flowchart further illustrating steps in some account security configuration lifecycle methods.

1000 flowchart shown in FIG. 10, which incorporates steps shown in FIGS. 7, 8, and 9

1002 use a computing system account; someone who uses an account is a user

1004 indicate physical age of a user, either expressly or implicitly

1006 have a login identity or a login authentication credential such as a password or token

1008 lack a login identity, lack a login authentication credential

1010 assist a supplementary user's effort to log into a supplementary account, e.g., by electronically expressing consent to the login

1012 secure an account, e.g., by using access controls, security credentials, or other technical measures that protect against violations of confidentiality, availability, or integrity

1014 third party, namely, someone who is not the primary user and not the supplementary user

1016 configure an account recovery mechanism, e.g., by designating an email address to receive an account recovery email

1018 assign a non-login account identifier to an account

1020 tag a photo or other documentary medium to digitally list a user as someone who is depicted in the documentary medium

1022 operate a computing system, e.g., log in, change settings, access account items

1024 provide an email address, e.g., connect an email address to an account so the email address will be recognized as an identifier of the account

1026 indicate a societal relationship between users

1028 perform account security provisioning, e.g., install credentials in the first instance

1030 revise account security provisioning, e.g., add to, modify, or delete previously installed credentials

1032 verify account security provisioning, by ascertaining credentials without changing the security configuration

1034 provision account security, e.g., by installing or modifying or removing security credentials

1036 provide an API

1038 manually transition to another lifecycle stage, as opposed to transitioning automatically as a side-effect of aging 610

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, software developers, engineers, and end-users are each a particular type of user 104. End-users may be adults or minors. Automated agents, scripts, playback software, and the like acting on behalf of one or more people may also be users 104, e.g., to facilitate testing a system 102, but end-users are people (not processes) unless clearly indicated otherwise. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104, but unless clearly indicated otherwise, end-users are human.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Account Environments

Figure 2:
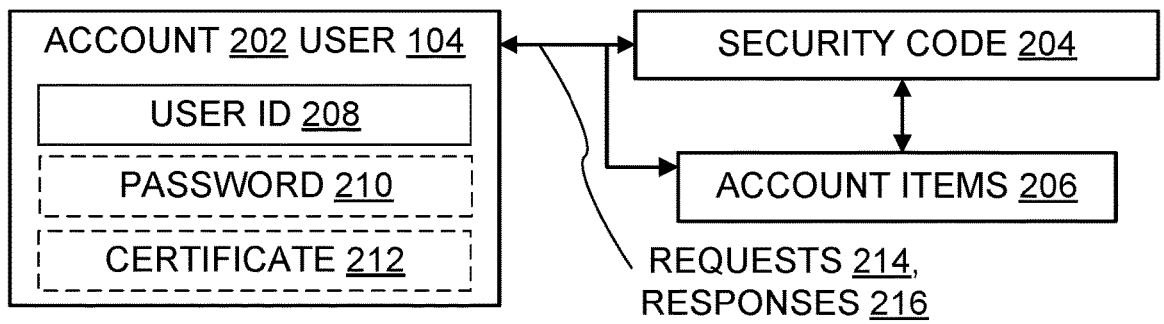
FIG. 2 is a block diagram illustrating aspects of user accesses to items through an account.
Figure 3:
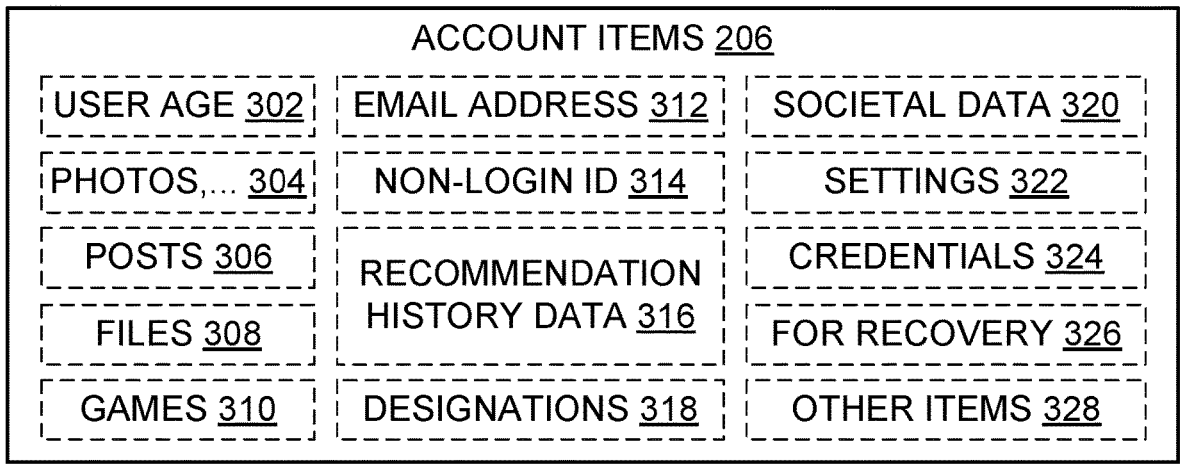
FIG. 3 is a block diagram illustrating account items, that is, items that may be accessed through a user account, or are associated with a user account as credentials or as user-specific data, or provide a service to the user through the account.

With reference to FIGS. 2 and 3, aspects of the present disclosure pertain to account security. An account 202 is a set of account items 206 secured by security code 204 which enforces access control on behalf of an end-user 104 according to one or more security credentials 324. Security code 204 may enforce discretionary access control, mandatory access control, role-based access control, other access controls, or a combination thereof. Initial access requests 214 to access account items go through the security code; subsequent authorized accesses may also go through the security code, or may be direct to an item once the end-user's authority to access the item is recognized. The end-user is identified to the security code by a user ID 208, which is authenticated by the security code, or authenticated by other code the security code calls or otherwise communicates with. Authentication may be performed using authentication mechanisms such as a password 210 or digital certificate 212.

Interactions between the end-user and the security code 204 or account items 206 include requests 214 from one side and responses 216 from the other side, as indicated by the arrows in FIG. 2. A given request may travel to an end-user, or from the end-user, with the corresponding response traveling in the other direction.

FIG. 3 shows account item examples. In this Figure, all account item examples are shown in dashed lines to emphasize that a given account does not necessarily include any particular subset of these examples. But it will be understood that in an actual account 202, the set of account items 206 is not empty. The illustrated examples of account items 206 include an indication 302 of a user's age, photos and other documentary media 304, posts 306, files 308 (which includes photos and other data stored in files), games 310, an email address 312, a non-login ID 314 such as a GUID, recommendation history data 316, designation 318 of one or more security-configuration-related accounts (a supplementary account designates a single primary account, but in some implementations a primary account may designate more than one supplementary account and may have a different security configuration with respect to each designated supplementary account), data 320 which indicates a societal relationship between users 104, account settings 322, account security credentials 324, data 326 regarding an account recovery mechanism, and other account items 328. Other account items 328 include any digital artifact or digitally-provided service which is secured by security code 204 that enforces access control on the item on behalf of the account's end-user(s) 104 according to one or more of the account's security credentials 324.

Figure 4:
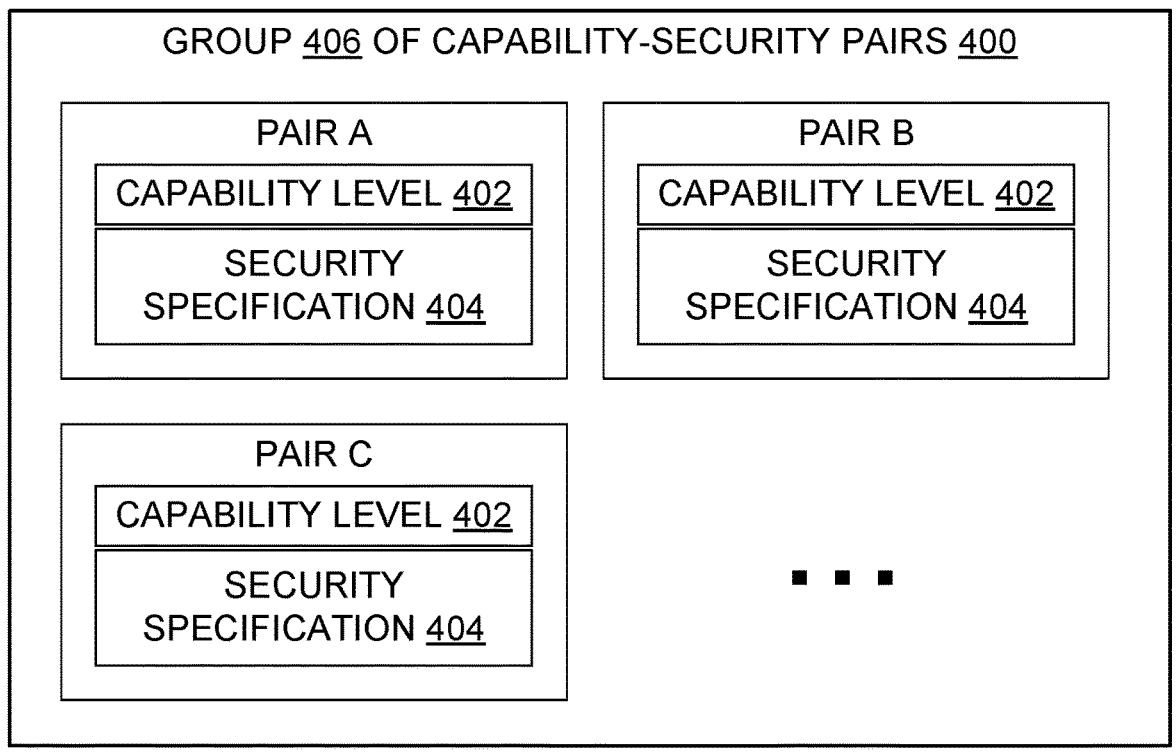
FIG. 4 is a block diagram illustrating capability-security pairs.
Figure 5:
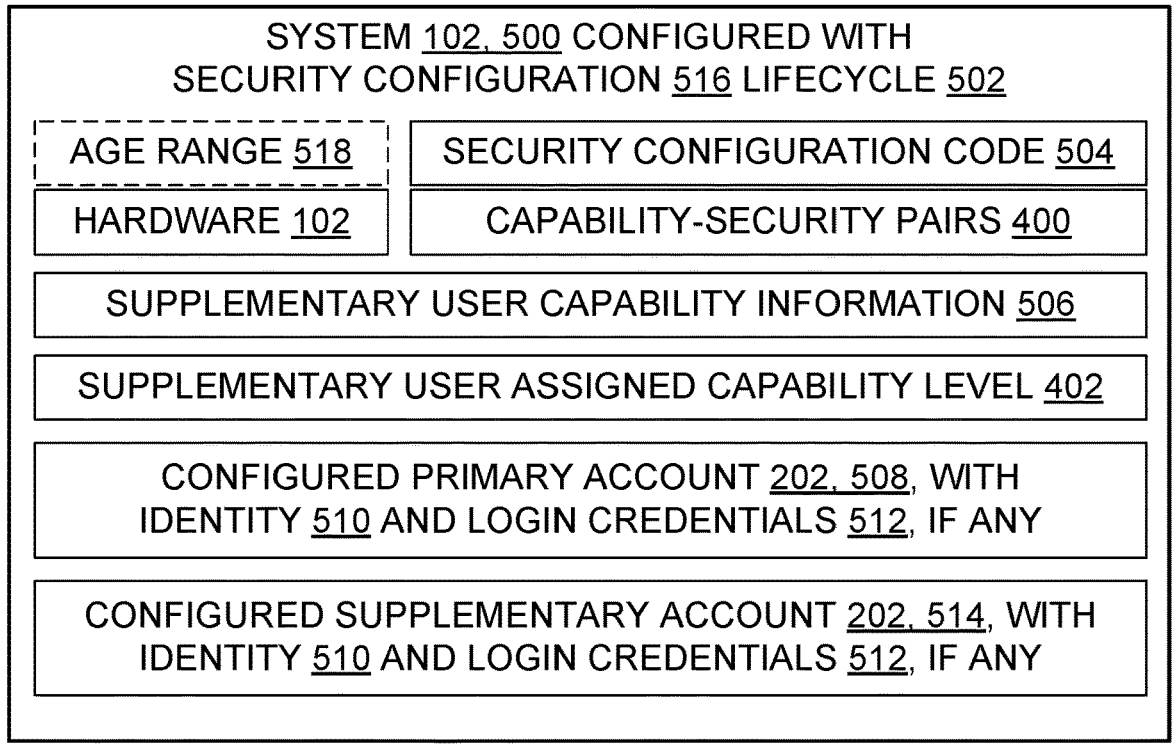
FIG. 5 is a block diagram illustrating aspects of a system which is configured for cybersecurity using a security configuration lifecycle.

With regard to FIGS. 4 and 5, a system 102 may be configured according to teachings herein to be a system 500 which operates according to a lifecycle 502 that controls changes in security over time, by modifying the security configuration 516 of an account 202 which resides on or is otherwise accessed through the system 500.

In some embodiments, the security configuration lifecycle 502 is implemented using a group 406 of capability-security pairs 400. Each capability-security pair 400 associates a supplementary end-user's capability level 402 with a security specification 404. The security specification 404 specifies account security configurations 516 for the supplementary user's account 514 and for a primary user's account 508 that is designated by the supplementary user's account. For example, a capability-security pair A might associate a first security specification with a toddler capability level, while a capability-security pair B associates a second security specification with a tween capability level, and a capability-security pair C associates a third security specification with a teen capability level. In this example, the first security specification would give a toddler less power as a user than the second security specification gives a tween as a user, and the third security specification in turn gives the teen more power over an account than the tween received.

The security specification 404 may specify an identity 510 for each account 202. The security specification 404 may specify login credentials 512 for use in authenticating the identity 510.

The capability-security pair grouping 406 may arrange the capability-security pairs 400 in a sequence, such as a sequence based on user age 302 ranges. The capability-security pairs 400 and the executable code which reads them may be part of security configuration code 504. The capability level that applies to a given end-user (who is a supplementary account user a.k.a. supplementary user in this example) may be determined by security configuration code 504 on the basis of that end-user's capability information 506, such as the end-user's physical age or a descriptive category label such as "toddler", "tween", "teen" or the like. Security configuration code 504 may be part of the security code 204.

Figure 6:
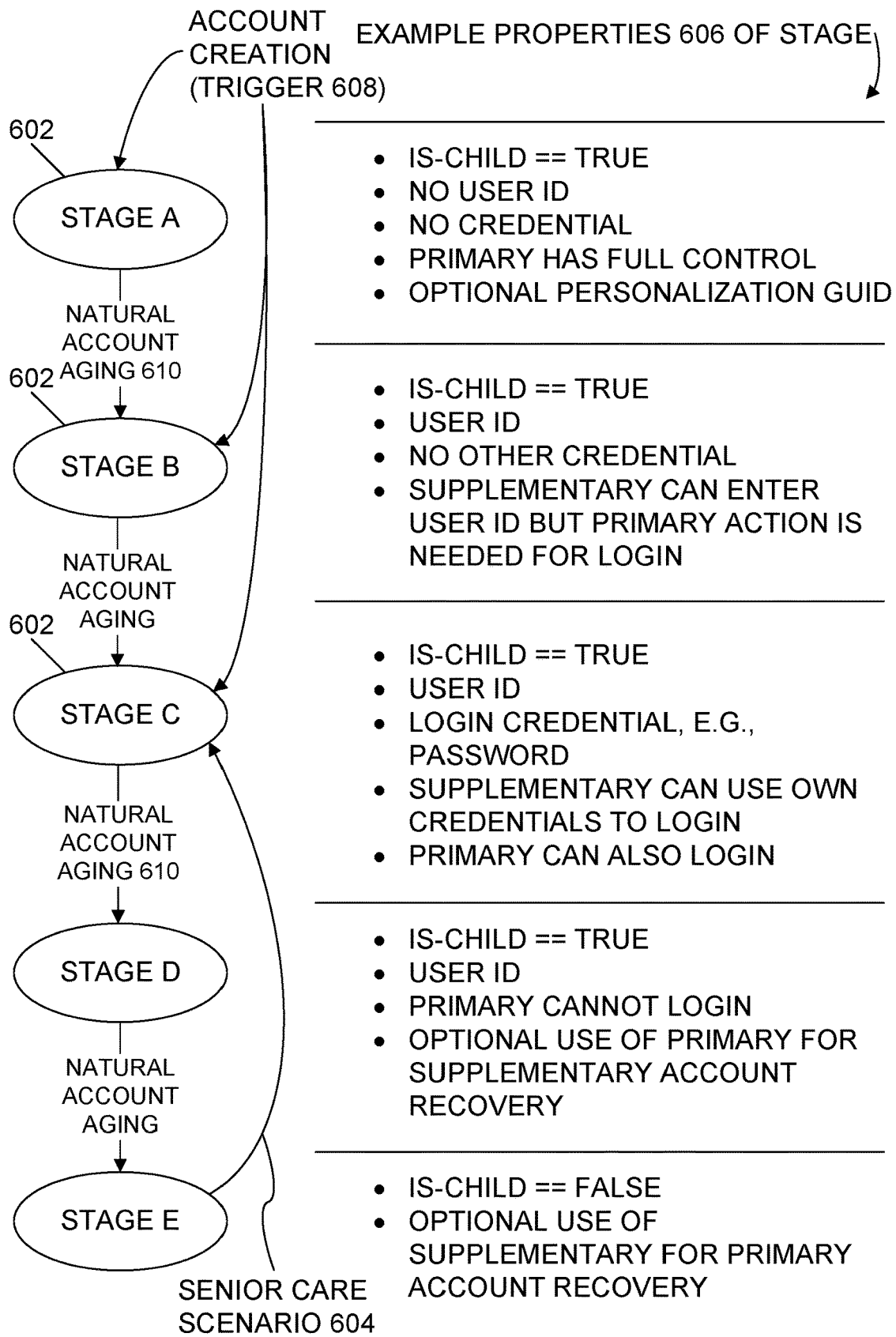
FIG. 6 is a diagram illustrating an example of stages in a security configuration lifecycle.

FIG. 6 illustrates a security configuration lifecycle 502 which has multiple stages 602, and gives example properties for each illustrated stage. This example illustrates another view of how a security configuration lifecycle 502 could be architected. The use of capability-security pairs 400 is one way to implement the FIG. 6 example, with each particular stage corresponding to a particular capability-security pair 400. But other implementations could also be used. An embodiment could, for example, include a state machine which moves through states that correspond to respective stages 602, or include a set of objects whose members implement properties 606 and for which the current stage 602 is represented by an object address, or include executable code in which the stages are different sections of code and the current stage 602 is implicit in an instruction counter or explicit in a global variable. One of skill will acknowledge that a variety of other implementations are also possible without departing from the teachings provided herein.

FIG. 6 also shows a Boolean variable is-child, whose value indicates whether the supplementary user is a minor. As another example of the extent of possible implementations, one implementation may include such a Boolean variable, while another implementation does not include a Boolean variable dedicated solely to representing the child vs. adult distinction.

FIG. 6 also illustrates flow through different stages 602, depicted by arrows. The flow may start with a trigger 608 which triggers creation of a supplementary account. The trigger 608 could be an express request from a child for the system to get permission from their parent and create an account for them (the child), for example. Or the trigger 608 could be an express request from the parent to create the child's account as a supplement to the parent's account, or the trigger could be an express request from a teacher to create N supplementary accounts for N respective students. Or the trigger 608 could be the tagging and labeling—with a name previously unknown to the system 500—of a sonogram or an image of an expectant mother, from which the system infers the existence of an unborn who will be the supplementary account user in due course. As indicated, supplementary account creation does not necessarily position the resulting supplementary account in lifecycle stage A; an account for an older child could start in stage B or even stage C, for example.

In the illustrated set of lifecycle stages 602, the parent or other primary user is largely or entirely in control when the accounts are in stage A or stage B. Control is shared with the supplementary user in stage C. In stage D, the child or other supplementary user is largely in control of the supplementary account.

With regard to account creation triggers 608, user ages 302, pregnancy status, and all other personal data in the system 102 or configured system 500, all applicable laws, regulations, end user license agreement provisions, service provider policies, and other privacy safeguards and promises should be honored. System implementers, system administrators, system debugger personnel, and any other personnel who have or may have access to personally identifiable information or other private information of any user should be duly trained and incentivized to understand and follow all of the standards, procedures, policies, regulations, and laws that apply in a given situation to protect user privacy. Any interpretation of the present disclosure which indicates that violation of privacy is acceptable is an incorrect and unreasonable interpretation.

As indicated by arrows in FIG. 6, an account may undergo natural aging 610 in which the primary and supplementary accounts are automatically reconfigured over time as the supplementary user ages. For example, consider an implementation in which state A corresponds to supplementary users from age unborn to age three years, and state B corresponds to supplementary users from age three years to age six years. Assume the system has been given a particular supplementary user's birthdate and has calculated that this supplementary user just turned three. Then the system 500 may automatically transition the account of this supplementary user and the primary account designated therein, from stage A to stage B. Notice of the transition could then be sent, to the primary user or the supplementary user, or both.

As indicated by an arrow in FIG. 6 from stage E back to stage C, an account may undergo reverse transitions, i.e., a decrease in the power given to the supplementary user. This may occur, for instance, in a senior care scenario 604 in which an elderly adult is losing capacity (physical, mental, or both) or is simply less interested or unwilling to exercise full responsibility for his or her account. In this case, the account of the senior may be treated as a supplementary account, with the account of the senior's caregiver (their offspring or a professional) being treated as the primary account. Accordingly, these two accounts may be configured or reconfigured to give more responsibility and corresponding capability to the caregiver and to remove some account capability from the senior.

More about Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Some embodiments use or provide a cybersecurity lifecycle configured system 500, e.g., a computing system 102 configured with a security configuration lifecycle 502 that is based on user capability. This system 500 includes at least one processor 110 and a digital memory 112 in operable communication with the processor. This system 500 also includes a set of three or more digitally implemented capability-security pairs 400, with each capability-security pair including a respective capability level 402 and a corresponding security specification 404. The security specification 404 specifies a security configuration 516 of a primary account 508 of a primary user 104 and a supplementary account 514 of a supplementary user 104.

In this example, these capability-security pairs 400 include at least the following. A pair 400 denoted here as pair A has a security specification which specifies that the supplementary account has no login identity 510, and the supplementary account has no login credential 512 apart from the primary account. A pair 400 denoted here as pair B has a security specification which specifies that the supplementary account has an identity 510 apart from a login identity of the primary account, but the supplementary account lacks sufficient login credentials 512 for the supplementary user to login to the supplementary account without assistance from the primary user. A pair 400 denoted here as pair C has a security specification which specifies that the supplementary account has a login identity 510 apart from a login identity of the primary account, the supplementary account has sufficient login credentials 512 for the supplementary user to login without assistance from the primary user, and the primary account also has a supplementary account login credential which permits the primary user to login to the supplementary account.

In this example, and with reference now to at least FIGS. 4, 5, 7, 8, this system 500 also includes account security configuration code 504 residing in the memory 112. Upon execution with the processor 110, security configuration code 504 performs the following: (i) obtains 708 supplementary user capability information 506, (ii) assigns 802 a capability level 402 to the supplementary user based at least in part on the supplementary user capability information, (iii) selects 804 a capability-security pair 400 corresponding to the assigned supplementary user capability level 402, and (iv) configures 710 a primary account 508 and a related (e.g., designated 318) supplementary account 514 so they are consistent with the security specification 404 of the selected capability-security pair. In this example, the pair A capability level indicates less supplementary user capability than the pair B capability level, and the pair B capability level indicates less supplementary user capability than the pair C capability level.

In some embodiments, in a computing system 500 at least two of the following conditions are satisfied: the pair A capability level 402 indicates the physical age of the supplementary user is in a range whose highest endpoint is not greater than five years old; the pair B capability level 402 indicates the physical age of the supplementary user is in a range whose lowest endpoint is not less than four years old; the pair B capability level 402 indicates the physical age of the supplementary user is in a range whose highest endpoint is not greater than eight years old; the pair C capability level 402 indicates the physical age of the supplementary user is in a range whose lowest endpoint is not less than eight years old; the pair C capability level 402 indicates the physical age of the supplementary user is in a range whose highest endpoint is not greater than thirteen years old; or the physical age of the supplementary user is greater than eighteen but the supplementary user is assigned a capability level 402 which is at the pair C capability level or lower, based on the supplementary user capability information.

In the stated conditions, the ages given are not necessarily endpoints; they are constraints on endpoints. Thus, a range from zero to three years old, a range from zero up to but not including four years old, and a range from zero to five years old are each "a range whose highest endpoint is not greater than five years old". Also, the last listed condition, in which the physical age of the supplementary user is greater than eighteen, is pertinent to a senior care scenario (a.k.a. "dependent senior" scenario) 604, whereas the other listed conditions are pertinent to scenarios involving supplementary users who are minors (as defined by applicable local laws, regulations, policies, standards, or end user license agreements).

In some embodiments, in a computing system 500 the account security configuration code 504 will upon execution automatically transition 806 at least the supplementary account 514 as the supplementary account ages 610, thereby increasing over time the capability level 402 that is assigned 802 to the supplementary user.

In some embodiments, in a computing system 500 the supplementary account has a globally unique identifier 314 that is not surfaced as a login identity 510 but is visible to applications 124 to distinguish the supplementary account 514 from the primary account 508.

In some embodiments, the account security configuration code 504 selects capability-security pair B or its functional equivalent under some other name than "B", and the supplementary account 514 has an email address 312 apart from the primary account.

In some embodiments, the computing system 500 includes data 320 which indicates at least one of the following societal relationships exists between the supplementary user and the primary user: child↔parent, child↔teacher, child↔guardian, ward↔guardian, patient↔provider, care-recipient↔caregiver, dependent-parent↔offspring. For example, these societal roles may be presented as data labels or field labels or other labels in a user interface. In some cases, societal roles may be presented as examples in online tutorials or other user documentation. In some implementations, societal roles may be presented through role-indicating identifiers in source code, which was compiled to create the security configuration code 504 and thus role-indicating identifiers may appear internally as symbols in a symbol table or the like within code 504.

In some embodiments, in a computing system 500 the capability-security pair capability levels 402 are indicated by supplementary user age ranges 518, and the capability-security pair capability levels collectively span a continuous range of physical ages from age five or less to age thirteen or more. For instance, a group of capability levels could have embedded or otherwise corresponding age ranges 518 according to any of the following examples, wherein { } indicates the group 406 and [ ] indicates a single age range, and integers are in years of age unless indicated otherwise, with birth at zero:

{[2 . . . 3], [3 . . . 5], [5 . . . 7], [7 . . . 11], [11 . . . 13], [13 . . . 17], [18 . . . 21], [21 . . . 111] }

{[0 . . . 2], [2 . . . 4], [4 . . . 7], [7 . . . 13], [13 . . . 18], [18 . . . 99] }

{[−6 months . . . 2 years], [2 . . . 4], [4 . . . 7], [7 . . . 13], [13 . . . 18], [18 . . . 100] }

{[5 ... 9], [9 ... 13] }
{[0 ... 5], [5], [6], [7], [8], [9], [10], [11], [12], [13], [14 ... 18] }

One of skill will acknowledge that many other capability level groups also can be defined in which capability-security pair capability levels collectively span a continuous range of physical ages from age five or less to age thirteen or more.

Methods

FIG. 7 illustrates a method 700 which is an example of methods performed or assisted by security configuration code 504, for instance, and which creates a supplementary account and configures it together with a primary account according to a security configuration lifecycle 502. This method includes detecting 702 a supplementary account creation trigger, which may be accomplished for example by receiving GUI input or other data expressly or implicitly requesting 214 creation of a supplementary account.

Then the illustrated method creates 704 the supplementary account, which may include allocating space for an account in system structures. Account creation may also include assigning the account a user ID 208, which was likely provided in the creation request but could be internally generated. Account creation may also include associating any default account items 206 with the new account, e.g., default settings 322, and perhaps an automatically generated GUID 314.

Then the illustrated method designates 706 the new supplementary account and the primary account as security-configuration-related to one another. The primary account may be identified in the supplementary account creation request 214, or may be whatever primary account has the focus when the trigger 608 occurs, for instance, or may be determined from an email address given in a supplementary account creation request from a minor.

Then the illustrated method obtains 708 supplementary user capability information 506. This information 506 may be in the account creation request, or may be obtained from the primary account's user.

Then the illustrated method configures 710 the supplementary and primary accounts according to an implementation of the security configuration lifecycle 502 teachings herein, e.g., by adding, modifying, or removing security credentials in each account to match the properties 606 of a lifecycle stage or the security specification of a capability-security pair, based on at least the capability level of the supplementary user whose account is being created and configured. Primary user preferences may also be considered, e.g., any of the properties shown in FIG. 6 as "optional" may be configured based on primary user preferences 328, or in some embodiments, based on system default settings. The configuration results position 712 the supplementary and primary accounts within the security configuration lifecycle 502, e.g., by positioning them at a particular stage 602 in the lifecycle.

FIG. 8 illustrates a method 800 which is another example of methods that configure a supplementary account together with a primary account according to a security configuration lifecycle 502. This method obtains 714 supplementary user capability information 506, assigns 802 a capability level 402 to the supplementary user (or equivalently, to the supplementary user's account 514) based on the capability information 506, and configures 710 the supplementary and primary accounts according to an implementation of the security configuration lifecycle 502 teachings herein. Then some time passes, and aging 610 occurs. Depending on the supplementary user's age when the capability level was last assigned 802 and the endpoints of the age ranges 518 that implement the lifecycle 502, the amount of time passed during this aging may be from as little as a day to several years, or more. At some point, the supplementary user's age exceeds to previously assigned capacity level's maximum age, and the system 500 transitions 806 into a later lifecycle stage.

FIG. 9 illustrates a method which performs one or more utilizations of the security lifecycle. A system 500 has accounts 508 and 514 which have been or now are configured 710 to have a security configuration lifecycle 502 as taught herein. This provides various advantages through improvements to computing system functionality.

For example, a system 500 may choose 902 or recommend a consent obtention procedure 904 based on the supplementary user's current capability level or the supplementary account's current security configuration lifecycle stage 602. A consent obtention procedure is a procedure for obtaining the primary user's consent as to an action or non-action regarding the supplementary user. Different consent procedures may be legally mandated, or they may be preferred as a policy matter, depending on a supplementary user's age.

For example, it may be the case in one jurisdiction that parental consent is required before a website can ask any child less than 13 years old for personal information such as a name, an address, or any photo or other documentary media 304 that includes the child's image or a recording of the child's voice. Another jurisdiction may require such parental consent for any child less than 14 years old. Users who are older than the threshold applicable in the jurisdiction may be legally able to give consent themselves.

Different account items 206 may have different associated consent ages. For example, a jurisdiction may have a consent threshold of 13 years old for uploading personal information and a consent threshold of 18 years old for browsing the web (through the account) with reduced content filtering or with no content filtering.

By querying one or more account APIs on a primary account or a supplementary account, for example, a service item 206 may efficiently choose a legally effective consent procedure. This functionality can reduce inefficient or ineffective use of computing system resources, and may avoid delays that would have resulted from non-automated consent obtention.

In a given system 500, a consent obtention procedure is implemented by code 504 which generates user interface forms, processes input responses, and otherwise executes to obtain and memorialize the consent. This may include making credit card charges or otherwise performing automated steps to verify the right to give consent.

A system 500 may maintain 906 separate recommendation histories 316 for the supplementary user and the primary user. Thus, even if the lifecycle stage is such that a child does not have a separate login from the parent, video selections made by the child in the child's account do not skew recommendations made to the parent for the parent's viewing. Moreover, after the child's account transitions 806 to a later stage 602 in which the child does login separately, the child's recommendation history continues to inform recommendations made to the child, and remains separate from the parent's recommendation history. In some embodiments, the transitioning itself, or the current stage of the child's account, or both, are made visible to the service or other account item 206 providing the recommendations, and thus can inform the recommendations being made. By querying one or more account APIs, for instance, a video streaming service could automatically determine that a primary user R is an adult, a supplementary user G is a child aged four to six years, and a supplementary user T is a teen aged thirteen to seventeen years. This age information allows more relevant recommendations to be made. As indicated elsewhere herein, personal information such as user age ranges should be provided through the API or otherwise only with user consent to the uses for which the personal information is being provided, and only subject to all applicable privacy rights.

A system 500 may include a non-login ID 314 with a supplementary account, even when the supplementary account has no login credential apart from the login credentials of its primary account. This non-login ID 314 allows applications 124 and account service items 206 to personalize 908 content to the supplementary user. For example, the sonogram 304 could be part of the personal content whose access control mechanisms will transition 806 over time as the user matures. The lifecycle stage information also helps connect documentary media items created years apart to the same supplementary user, e.g., during creation of a timeline with attached media. An application or service may connect photos that were created years apart to a particular supplementary user despite that user's changes in appearance over the years. When the supplementary user reaches an age of majority, or the supplementary account transitions 806 into a stage such as FIG. 6 lifecycle stage D where the primary user can no longer login to the supplementary account, the supplementary user nonetheless continues to have access to their personal data.

Over time, and subject to privacy and security safeguards and with appropriate consents given, machine learning may be applied using the non-login ID 314 to tag (or tag subject to confirmation) or otherwise consistently identify the supplementary user in documentary media 304, on social networking sites. Such user identification may be performed to support offering advertisements or recommendations that are tailored to the supplementary user, and to provide other personalized services. Machine learning guided by the non-login ID 314 may help recognize the supplementary user at different ages.

Recognizing varied content as pertaining to the same supplementary user, particularly over the span of years, may also help code reason about the user. Automated reasoning may be performed, e.g., when determining how best to obtain legal consent for actions involving personal information or privacy or maturity or legal status of the supplementary user, and when separating content that is solely or mainly relevant to the primary user from content that is solely or mainly relevant to the supplementary user. Over time, the supplementary user may receive full control of the supplementary account, without losing the years of digital history (pictures and other content, preferences, and so on) that were created in the account before the supplementary user fully matured.

More generally, as taught herein by implementing a security configuration lifecycle 502, a system 500 can increase 910 supplementary user access to a supplementary account while still protecting 912 and preserving 914 the integrity of primary account items. FIG. 6 provides an example of increasing 910 supplementary user access. At stage A the supplementary user effectively has no access, except perhaps by viewing an account item as they are held by a parent primary user or as they sit on the parent's lap. At stage B, supplementary user access can be made through a supplementary user's own ID 208. At stage C, the supplementary user can login directly using its own login credentials, which it did not have in stage A or stage B. At stage D, supplementary user access control is further increased 910 in the sense that now the primary user cannot login directly to the supplementary user account.

FIG. 10 further illustrates some method embodiments in a general flowchart 1000. Technical methods shown in the Figures or otherwise disclosed will be performed automatically, e.g., by cybersecurity system 500 overall or security configuration code 504 in particular, unless otherwise indicated. Methods may also be performed in part automatically and in part manually to the extent action by a human administrator or other human person is implicated, e.g., in some embodiments a parent or other primary user may set age range 518 endpoints that determine which stage 602 applies. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIG. 10. Steps may be performed serially, in a partially overlapping manner, or fully in parallel. The order in which flowchart 1000 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Some embodiments use or provide a computer-implemented method for configuring computing system accounts based on a security configuration lifecycle. During use 1002 in a computing system 500 of a primary account 508 by a primary user, the system electronically detects 702 a supplementary account creation trigger 608. In response to the supplementary account creation trigger, the system electronically creates 704 a supplementary account 514 for a supplementary user. The system designates 706 the supplementary account and the primary account as accounts having respective security configurations 516 which relate to one another, and obtains 708 supplementary user capability information 506. In this example, the supplementary user capability information 506 indicates 1004 that the supplementary user has a physical age that is less than eighteen years. A different age may be indicated 1004 in other methods, such as fourteen years, or thirteen years, or another legally significant age. Based on at least a portion of the supplementary user capability information, the system performing this method automatically configures 710 the primary account and automatically configures 710 the supplementary account, thereby positioning 712 the configured accounts in exactly one of a predefined group of security configuration lifecycle stages.

In this example, the predefined group of security configuration lifecycle stages includes a stage denoted here as stage A, in which the supplementary account has no login identity, and the supplementary account has no login credential apart from the primary account; a stage denoted here as stage B, in which the supplementary account has an identity apart from a login identity of the primary account, but the supplementary account lacks sufficient login credentials for the supplementary user to login to the supplementary account without assistance from the primary user; and a stage denoted here as stage C, in which the supplementary account has a login identity apart from a login identity of the primary account, the supplementary account has sufficient login credentials for the supplementary user to login without assistance from the primary user, and the primary account also has a supplementary account login credential which permits the primary user to login to the supplementary account.

In short, this method performs 1028, revises 1030, or verifies 1032 identification and authentication provisioning 1034 of the primary and supplementary accounts. This provisioning control is done in a manner which (i) is consistent with the supplementary user's physical age being under eighteen years, (ii) helps secure 1012 the supplementary account against access by unauthorized third parties 1014, and (iii) positions 712 the primary and supplementary accounts together within a security configuration lifecycle 502. Consistency with the supplementary user's physical age being under eighteen years would be violated, for example, by violating any of the laws, regulations, standards, or policies as to the privacy and protection of minors in the applicable jurisdiction.

In some embodiments, the method includes reconfiguring 710 at least the supplementary account and thereby transitioning 806 from stage A to stage B or transitioning from stage B to stage C, or transitions between differently named but functionally equivalent stages.

In some embodiments, the method includes reconfiguring 710 at least the primary account and thereby transitioning 806 from stage C to a stage D in which the primary account no longer has a supplementary account login credential. In some of these, the method further includes configuring 1016 the primary account in stage D as part of an account recovery mechanism 326 for recovery of access to the supplementary account.

In some embodiments, the method includes automatically choosing 902 a consent obtention procedure 904 based at least partially on (i) the current security configuration lifecycle stage, or (ii) a supplementary user capability level that is associated with the current security configuration lifecycle stage.

In some embodiments, the accounts 508, 514 are in stage B or they are in stage C, and the method further includes maintaining 906 separate recommendation histories 316 for the supplementary user and the primary user.

In some embodiments, creating 704 a supplementary account for a supplementary user includes assigning 1018 a non-login account identifier 314 to the supplementary account, and making the non-login account identifier available to an application for use in content personalization, e.g., via providing 1036 an API.

In some embodiments, the method positions 712 the accounts 508, 514 in stage A or a functionally equivalent stage having some other name, and the supplementary account creation trigger is generated by or otherwise corresponds to an action which tags 1020 any of the following in an image: an unborn child, an infant less than eighteen months old. In other embodiments, a different age threshold is used, e.g., twelve months, or twenty-four months.

In some embodiments, the method includes transitioning 806 through at least two prior security configuration lifecycle stages to a stage E in which the supplementary account and the primary account each has its own login identity, each has its own login credentials, and each has no login credential to login to the other account.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as capability-security pairs 400, security configuration code 504, and security configuration lifecycle stages 602, in the form of data 118 and instructions 116, read from a removable storage medium 114 and/or another source such as a network connection, to form a configured storage medium. The configured storage medium 112 is capable of causing a computer system to perform technical process steps for enhancing cybersecurity by positioning 712 accounts together in a security configuration lifecycle 502, and transitioning 806 them together through the lifecycle stages 602 as a supplementary user matures, as disclosed herein. The Figures thus help illustrate configured storage media embodiments and process embodiments, as well as system and process embodiments. In particular, any of the process steps illustrated in FIG. 7, 8, 9, or 10, or otherwise taught herein, may be used to help configure a storage medium to form a configured storage medium embodiment.

Some embodiments use or provide a computer-readable storage medium 112 configured with executable code for performing a method for configuring computing system accounts based on a security configuration lifecycle. The method includes obtaining 714 supplementary user capability information which indicates that a supplementary user has a capability level corresponding to an age that is less than eighteen years. Based on the supplementary user capability level, the method automatically configures 710 a primary account and automatically initially configures 710 a supplementary account, thereby positioning 712 the accounts in exactly one of the following security configuration lifecycle stages 602: a stage denoted here as stage A, in which the supplementary account has no login identity, and the supplementary account has no login credential apart from the primary account; a stage denoted here as stage B, in which the supplementary account has an identity apart from a login identity of the primary account, but the supplementary account lacks sufficient login credentials for the supplementary user to login to the supplementary account without assistance from the primary user; a stage denoted here as stage C, in which the supplementary account has a login identity apart from a login identity of the primary account, the supplementary account has sufficient login credentials for the supplementary user to login without assistance from the primary user, and the primary account also has a supplementary account login credential which permits the primary user to login to the supplementary account. Other lifecycle 502 stages may also be implemented in the code configuring the storage medium 112. This method allocates identification and authentication security control between the primary and supplementary accounts and helps secure the supplementary account against access by unauthorized third parties.

This example also includes aging of the accounts. At least one month after initially configuring the supplementary account, the method reconfigures 710 at least the supplementary account by transitioning 806 from stage A to stage B, or by transitioning 806 from stage B to stage C.

In some embodiments, the computer-readable storage medium is configured such that the method further includes at least one of the following additional steps. One possible additional step is automatically choosing 902 a consent obtention procedure based at least partially on (i) the current security configuration lifecycle stage of the supplementary account, or (ii) a current capability level of the supplementary user. Another possible additional step is maintaining 906 separate recommendation histories for the supplementary user than for a primary user of the primary account. Another possible additional step is positioning 712 the primary account and a second supplementary account in another security configuration lifecycle stage 602, whereby the same primary account relates to two distinct supplementary accounts in two different respective security configuration lifecycle stages. Another possible additional step is automatically creating 704 the supplementary account in response to a primary user of the primary account tagging the supplementary user in a photo. Another possible additional step is creating 704 the supplementary account in response to an explicit account creation request from a primary user of the primary account.

In some embodiments, the method includes transitioning 806 the primary account and the supplementary account during a period of at least twelve months through at least three security configuration lifecycle stages 602. In this example, these stages include at least one stage in which only the primary user is credentialed to login to the supplementary account, at least one stage in which the primary user and the supplementary user are each credentialed to login to the supplementary account, and at least one stage in which only the supplementary user is credentialed to login to the supplementary account.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

In some embodiments, security code 204 walks a primary user through a sequence such as the following, via a user interface, for a stage B login: "Sign In"→"More Options-"→"Sign in for a child"→"First sign in to your own account"→primary user ID and password entered and accepted→"Pick a child account to sign into"→Child account selected, e.g., for "Bobby"→"Bobby is now signed in. To keep your stuff out of reach of your child we'll sign out your account unless you tick the box below"; the box's labeling text reads "Keep me signed in on this device".

Depending on the implementation, the kind of account item to be accessed, the age of the supplementary user, and other factors, a particular implementation of teachings provided herein can provide advantages over other approaches to account security management. Some implementations reduce sign-up friction, by decreasing the number of user actions needed to create a securely configured supplementary account. Some implementations facilitate keeping a parent's account items and a child's account items separated, to prevent inadvertent damage to the parent's items, and to prevent mingling which would skew recommendation results. In some, if not all, implementations the programming model previously employed by applications to interact with a user account can still be employed, thereby mitigating loss in application functionality and avoiding re-development of applications.

In some conventional approaches, adding a child account to a family account proceeds along the following lines. Through a GUI, an adult parent asks a system 102 to add the child to the family account. A child account sign-up procedure asks for the parent's email and does verification of it, asks for the family account password, asks for the child's given name and family name, the child's date of birth, the family's country or other jurisdictional identifier, and eventually for one or more proofs of the parent's age. When parental consent is required, the procedure asks for such consent, and may charge a credit card of the parent or take other action to verify that the purported parent is indeed an adult.

Under a modified procedure hereby taught, only the child's given name and date of birth are requested by a system 500 for creating a child's account 514 in lifecycle stage A. This improved approach permits a child of five, for example, to have her or his own supplementary account through which to play an age-appropriate online game 310. The child's parent has full security control of the child's account, which is separate from the parent's account 508 (the nominal family account). A vendor providing the online game to the account 514 is not required to make any changes to the code of the game in order to give the child this access to the game; from the vendor's perspective and the game's perspective, the child's account is simply another account.

In some conventional approaches, a child creating a child account proceeds along the following lines. Through a GUI, a child asks a system 102 to create an account. A child account sign-up procedure asks for the parent's email, asks for a password for the new child account, asks for the child's given name and family name, the child's date of birth, the child's country or other jurisdictional identifier, and eventually for one or more proofs of the parent's age. When parental consent is required, the procedure contacts the parent and asks for the child's personal information again, and for parental consent if required based on the child's age and the jurisdictional identifier. The procedure may charge a credit card of the parent or take other action to verify that the purported parent is indeed an adult.

Under a modified procedure hereby taught, the child is asked only for the child's given name and date of birth, jurisdictional identifier (may be inferred), and the parent's email. The procedure contacts the parent, has the parent sign in, has them confirm the child's name, date of birth, and country, gets parental consent as needed, and creates the child's account. This improved approach is much easier for the child. It permits the child to easily get her or his own supplementary account through which to play an age-appropriate online game 310. A vendor providing the online game to the account 514 is not required to make any changes to the code of the game in order to give the child access to the game; from the vendor's perspective (the game's perspective), the child's account is simply another account.

In some implementations, as the child grows and the parent wants to make the child's account more capable, the parent gives the child more capability (a.k.a. more "freedom") in the account. One implementation presents the parent with a slider, radio buttons, or other widget in a GUI, which the parent can move from "parentally owned" to "co-owned" to "graduated", or similar labels indicating increased capability. In this example at least, these transitions 806 may be commanded by the parent, i.e., they can be manual transitions 1038 done regardless of the child's physical age. Some children will be ready for more responsibility over their account at a different age than other children.

In one implementation, GUI-displayed explanatory text for the least capable stage 602 states a description along the lines of "Parentally owned: with this account you get to choose exactly where and when your child can sign in to their account."

In one implementation, explanatory text for a mid-capability stage 602 states a description along the lines of "Co-owned: when your child goes to a friend's house, they can sign in even though you're not there. Adding a password lets them sign in. Don't worry, you'll be able to reset the password if they forget it."

In one implementation, explanatory text for a high-capability stage 602 states a description along the lines of "Graduation: your child isn't little anymore. It's time to let them take over control of their account. But you can still share licenses, calendars, and other features."

Some technical problems which motivated aspects of the innovations described herein arose during contemplation or investigation of a scenario of a parent setting up a child's accounts. For example, the inventors asked themselves how a sign-up process could be made less onerous from the user perspective while still resulting in online game access for the child, protection of the parent's account items, and compliance with consent requirements. However, one of skill will acknowledge that teachings herein also generalize to other relationships, e.g., grandparent/grandchild, guardian/child, teacher/child, guardian/diminished capacity ward, and so on. Accordingly, the terminology "primary user" and "supplementary user" encompasses "parent" and "child" but is not limited to "parent" and "child".

One of skill will also recognize that security lifecycle teachings herein can be applied for transitions in both directions of supplementary user capability change (increasing capabilities and decreasing capabilities). One may speak informally of someone entering their "second childhood" and of people with Alzheimers or diminished capacity as being "childlike". That informal observation may be applied (in hindsight) in the operational context of a security configuration lifecycle. Similarly, one may speak informally in terms of "mental age" as well as "physical age", and that informal characterization may be applied (in hindsight) to the technology herein, e.g., by implementing both automatic aging 610 transitions 806 based on physical age and user-initiated 1038 transitions 806.

Teachings herein encompass more than the specific example of a growing child, although that example was in an originating scenario. A person growing up and emerging from childhood has increasing capabilities and thus receives increasing supplementary account privileges, while an elderly or injured or ill or otherwise diminishing capacity person receives decreasing account privileges over time. These are additional reasons for understanding "primary user" and "supplementary user" to be broader than "parent" and "child".

CONCLUSION

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 7 through 10 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method for configuring computing system accounts based on a security configuration lifecycle, the method comprising:
   during use in a computing system of a primary account by a primary user, electronically detecting a supplementary account creation trigger;
   in response to the supplementary account creation trigger, electronically creating a supplementary account for a supplementary user; designating the supplementary account and the primary account as accounts having respective security configurations which relate to one another;
   obtaining supplementary user capability information which indicates that the supplementary user has a physical age that is less than eighteen years;
   based on at least a portion of the supplementary user capability information, automatically configuring the primary account and automatically configuring the supplementary account, thereby positioning the configured accounts in exactly one of the three following security configuration lifecycle stages:
   a stage denoted here as stage A, in which the supplementary account has no login identity, and the supplementary account has no login credential apart from the primary account;
   a stage denoted here as stage B in which the supplementary account has an identity apart from a login identity of the primary account, but the supplementary account lacks sufficient login credentials for the supplementary user to login to the supplementary account without assistance from the primary user;
   a stage denoted here as stage C, in which the supplementary account has a login identity apart from a login identity of the primary account, the supplementary account has sufficient login credentials for the supplementary user to login without assistance from the primary user, and the primary account also has a supplementary account login credential which permits the primary user to login to the supplementary account;
   whereby the method performs, revises, or verifies identification and authentication provisioning of the primary and supplementary accounts in a manner which (i) is consistent with the supplementary users physical age being under eighteen years, (ii) helps secure the supplementary account against access by unauthorized third parties, and (iii) positions the primary and supplementary accounts together within a security configuration lifecycle.

2. The method of claim 1, further comprising reconfiguring at least the supplementary account and thereby transitioning from stage A to stage B or transitioning from stage B to stage C.

3. The method of claim 1, further comprising reconfiguring at least the primary account and thereby transitioning from stage C to a stage D in which the primary account no longer has a supplementary account login credential.

4. The method of claim 3, further comprising configuring the primary account in stage D as part of an account recovery mechanism for recovery of access to the supplementary account.

5. The method of claim 1, further comprising automatically choosing a consent obtention procedure based at least partially on (i) the current security configuration lifecycle stage, or (ii) a supplementary user capability level that is associated with the current security configuration lifecycle stage.

6. The method of claim 1, wherein the accounts are in stage B or stage C, and the method further comprises maintaining separate recommendation histories for the supplementary user and the primary user.

7. The method of claim 1, wherein creating a supplementary account for a supplementary user comprises assigning a non-login account identifier to the supplementary account, and making the non-login account identifier available to an application for use in content personalization.

8. The method of claim 1, wherein the method positions the accounts in stage A, and the supplementary account creation trigger corresponds to an action which tags any of the following in an image: an unborn child, an infant less than eighteen months old.

9. The method of claim 1, wherein the method comprises transitioning through at least two prior security configuration lifecycle stages to a stage E in which the supplementary account and the primary account each has its own login identity, each has its own login credentials, and each has no login credential to login to the other account.

10. A computing system configured with a security configuration lifecycle that is based on user capability, the system comprising:
   a processor;
   a memory in operable communication with the processor;
   a set of three or more digitally implemented capability-security pairs, each capability-security pair including a respective capability level and a corresponding security specification which specifies security configuration of a primary account of a primary user and a supplementary account of a supplementary user, the capability-security pairs including at least the following:
   a pair denoted here as pair A whose security specification specifies that the supplementary account has no login identity, and the supplementary account has no login credential apart from the primary account;
   a pair denoted here as pair B whose security specification specifies that the supplementary account has an identity apart from a login identity of the primary account, but the supplementary account lacks sufficient login credentials for the supplementary user to login to the supplementary account without assistance from the primary user;
   a pair denoted here as pair C whose security specification specifies that the supplementary account has a login identity apart from a login identity of the primary account, the supplementary account has sufficient login credentials for the supplementary user to login without assistance from the primary user, and the primary account also has a supplementary account login credential which permits the primary user to login to the supplementary account;

account security configuration code residing in the memory which upon execution with the processor (i) obtains supplementary user capability information, (ii) assigns a capability level to the supplementary user based at least in part on the supplementary user capability information, (iii) selects a capability-security pair corresponding to the assigned supplementary user capability level, and (iv) configures a primary account and a related supplementary account so they are consistent with the security specification of the selected capability-security pair;

wherein the pair A capability level indicates less supplementary user capability than the pair B capability level, and the pair B capability level indicates less supplementary user capability than the pair C capability level.

11. The computing system of claim 10, wherein at least two of the following conditions are satisfied:
   the pair A capability level indicates the physical age of the supplementary user is in a range whose highest endpoint is not greater than five years old;
   the pair B capability level indicates the physical age of the supplementary user is in a range whose lowest endpoint is not less than four years old;
   the pair B capability level indicates the physical age of the supplementary user is in a range whose highest endpoint is not greater than eight years old;
   the pair C capability level indicates the physical age of the supplementary user is in a range whose lowest endpoint is not less than eight years old;
   the pair C capability level indicates the physical age of the supplementary user is in a range whose highest endpoint is not greater than thirteen years old; or
   the physical age of the supplementary user is greater than eighteen but the supplementary user is assigned a capability level which is at the pair C capability level or lower, based on the supplementary user capability information.

12. The computing system of claim 10, wherein the account security configuration code will upon execution automatically transition at least the supplementary account as the supplementary account ages, thereby increasing over time the capability level that is assigned to the supplementary user.

13. The computing system of claim 10, wherein the supplementary account has a globally unique identifier that is not surfaced as a login identity but is visible to applications to distinguish the supplementary account from the primary account.

14. The computing system of claim 10, wherein the account security configuration code selects capability-security pair B, and the supplementary account has an email address apart from the primary account.

15. The computing system of claim 10, wherein the system includes data which indicates at least one of the following societal relationships exists between the supplementary user and the primary user: child↔parent, child↔teacher, child↔guardian, ward↔guardian, patient↔provider, care-recipient↔caregiver, dependent-parent↔offspring.

16. The computing system of claim 10, wherein the capability-security pair capability levels are indicated by supplementary user age ranges, and the capability-security pair capability levels collectively span a continuous range of physical ages from age five or less to age thirteen or more.

17. A computer-readable storage medium configured with executable code for performing a method for configuring computing system accounts based on a security configuration lifecycle, the method comprising:
   obtaining supplementary user capability information which indicates that a supplementary user has a capability level corresponding to an age that is less than eighteen years;
   based on the supplementary user capability level, automatically configuring a primary account and automatically initially configuring a supplementary account, thereby positioning the accounts in exactly one of the three following security configuration lifecycle stages:
   a stage denoted here as stage A, in which the supplementary account has no login identity, and the supplementary account has no login credential apart from the primary account;
   a stage denoted here as stage B, in which the supplementary account has an identity apart from a login identity of the primary account, but the supplementary account lacks sufficient login credentials for the supplementary user to login to the supplementary account without assistance from the primary user;
   a stage denoted here as stage C, in which the supplementary account has a login identity apart from a login identity of the primary account, the supplementary account has sufficient login credentials for the supplementary user to login without assistance from the primary user, and the primary account also has a supplementary account login credential which permits the primary user to login to the supplementary account;
   whereby the method allocates identification and authentication security control between the primary and supplementary accounts and helps secure the supplementary account against access by unauthorized third parties; and
   at least one month after initially configuring the supplementary account, reconfiguring at least the supplementary account by transitioning from stage A to stage B, or by transitioning from stage B to stage C.

18. The computer-readable storage medium of claim 17, wherein the method further comprises at least one of the following:
   automatically choosing a consent obtention procedure based at least partially on (i) the current security configuration lifecycle stage of the supplementary account, or (ii) a current capability level of the supplementary user;
   maintaining separate recommendation histories for the supplementary user than for a primary user of the primary account; or
   positioning the primary account and a second supplementary account in another security configuration lifecycle stage, whereby the same primary account relates to two distinct supplementary accounts in two different respective security configuration lifecycle stages.

19. The computer-readable storage medium of claim 17, wherein the method further comprises one of the following:
   automatically creating the supplementary account in response to a primary user of the primary account tagging the supplementary user in a photo; or creating the supplementary account in response to an explicit account creation request from a primary user of the primary account.

20. The computer-readable storage medium of claim 17, wherein the method comprises transitioning the primary account and the supplementary account during a period of at least twelve months through at least three security configuration lifecycle stages, including at least one stage in which only the primary user is credentialed to login to the supplementary account, at least one stage in which the primary user and the supplementary user are each credentialed to login to the supplementary account, and at least one stage in which only the supplementary user is credentialed to login to the supplementary account.

* * * * *